(12) United States Patent
Stall et al.

(10) Patent No.: US 8,196,107 B2
(45) Date of Patent: Jun. 5, 2012

(54) SIMULATING STEPPING THROUGH INTERPRETED CODE

(75) Inventors: Jonathon Michael Stall, Bothell, WA (US); Jeffrey E. Stall, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 12/142,617

(22) Filed: Jun. 19, 2008

(65) Prior Publication Data

US 2009/0319999 A1      Dec. 24, 2009

(51) Int. Cl.
G06F 9/44      (2006.01)
(52) U.S. Cl. ........ 717/124; 717/125; 717/127; 717/129; 717/131; 717/135
(58) Field of Classification Search .................. 717/124, 717/125, 127, 129, 131, 135
See application file for complete search history.

(56) References Cited

U.S. PATENT DOCUMENTS

| | | | |
|---|---|---|---|
| 6,219,782 B1 * | 4/2001 | Khan et al. | 714/E11.21 |
| 6,480,818 B1 * | 11/2002 | Alverson et al. | 714/30 |
| 6,587,967 B1 | 7/2003 | Bates et al. | |
| 6,681,384 B1 | 1/2004 | Bates et al. | |
| 6,854,113 B1 | 2/2005 | Sankar et al. | |
| 6,978,399 B2 | 12/2005 | Bates et al. | |
| 7,203,926 B2 | 4/2007 | Bogle et al. | |
| 7,208,926 B2 | 4/2007 | Bogle et al. | |
| 2004/0210876 A1 | 10/2004 | Stall et al. | |
| 2006/0129991 A1 | 6/2006 | Kilian et al. | |
| 2006/0143608 A1 | 6/2006 | Dostert et al. | |
| 2007/0168972 A1 | 7/2007 | Bates et al. | |
| 2007/0250819 A1 | 10/2007 | Fjeldstad et al. | |
| 2007/0277165 A1 | 11/2007 | Stall et al. | |

OTHER PUBLICATIONS

Lee, et al. "Replay Debugging for Multi-threaded Embedded Software" 2010, IEEE, p. 15-22.*
Vrany, Jan, et al., "The Debuggable Interpreter Design Pattern", In Proceedings of the International Conference on Software and Data Technologies (ICSOFT 2007), Barcelona, Spain Jul. 2007, 8 pages.
Cai, Jinlong, et al., "Debugging a High Level Language via a Unified Interpreter and Compiler Runtime Environment", In proceedings of EACA'04, Universidad de Santander, Spain, 2004, 6 pages.

* cited by examiner

*Primary Examiner* — Qamrun Nahar
(74) *Attorney, Agent, or Firm* — Workman Nydegger

(57) ABSTRACT

The present invention extends to methods, systems, and computer program products for simulating stepping through interpreted code. Embodiments of the present invention facilitate debugging interpreted code. Thus, existing debugger technologies (e.g., those configured for use with compiled code) can be utilized to debug interpreted code. More specifically, existing debugger technologies can be used to step through interpreted code, without stepping into the code of interpreter itself. Accordingly, users developing interpreted code can be provided a stepping experience of relatively the same quality provided to developers developing compiled code, without having to reengineer debuggers to compensate for interpreted code.

20 Claims, 4 Drawing Sheets

SIMULATING STEPPING THROUGH INTERPRETED CODE

CROSS-REFERENCE TO RELATED APPLICATIONS

Not Applicable.

BACKGROUND

1. Field of the Invention

The invention is related to debuggers, and more specifically, to enabling a debugger to be used to step through interpreted code.

2. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Computer system tasks are typically implemented in computer code of software programs that run on a computer system to perform the various designed tasks. Depending on the software program, computer code for performing computerized tasks can vary from relatively simply to relatively complex. Further, the execution of computer code can be facilitated by an interpreter or a compiler.

When using a compiler, source code is input to a compiler. The compiler compiles the source code into an executable file that can be run directly against the operating system of a computer. When using an interpreter, source code is input directly to an interpreter that executes the source code (without generating an executable file).

With respect to all types of code, compiled and interpreted alike, it is desirable that the code be as free of errors as possible to assure a high quality product for the end user. However, it can take some amount of work by a software developer to get even relatively simple software programs to work as the software developer depends. During the development cycle computer code can run but not produce intended results, can run with errors (e.g., crashes, etc), or may simply not run at all. Thus, within the development cycle a software developer can take diagnostic measures, such as, for example, debugging and testing computer code, to identify and correct design and execution problems with a software program.

Typically a developer runs a program inside a debugger that essentially monitors execution of the program. A debugger permits a developer to take various diagnostic measures to identify and correct coding errors, such as, for example, setting breakpoints, stepping though code, inspecting values, etc. Many industrial-quality debuggers, such as Visual Studio, are targeted at compiled code.

Unfortunately, typical debuggers are not well suited to debugging interpreted code. Since an interpreter is also a program, code from an interpreter is intermingled with source code during interpretation of the source code. A debugger typically has no way to distinguish between source code and interpreter code. This make is difficult, if not impossible, for a developer to use a debugger to debug interpreted code, since they are unable to distinguish their source code form interpreter's code. For example, stepping between lines of code, a developer could step from interpreter code to source code or vice versa and not know.

BRIEF SUMMARY

The present invention extends to methods, systems, and computer program products for simulating stepping through interpreted code. In some embodiments, a computer system is configured to adapt interpreted code into a format that is compatible with a stepping operation of a debugger. An interpreter receives an indication that it is to interpret source input data. The interpreter initiates a primary thread to interpret the source input data. The primary thread includes a primary physical call stack for the interpreter. A "virtual call stack" for the source input data is stored as data within the primary physical call stack. The virtual call stack changes as the interpreter executes.

The primary thread defines states in the source input data. The primary threads initializing an auxiliary thread. The auxiliary thread includes an auxiliary physical call stack and a helper function. The helper function is configured to emit code portions corresponding to each defined state. The code portions are in a format that is compatible with the stepping operation of the debugger. The helper function is configured to receive inter-thread communication from the primary thread indicative of entering and leaving defined states within the source input data during interpreting.

The helper function is configured to manage the auxiliary physical call stack to represent the virtual call stack for the source input data to the debugger. Managing the auxiliary thread includes pushing emitted code portions onto the auxiliary physical call stack in response to corresponding inter-thread communication indicative of entering a defined state in the source input data. Managing the auxiliary thread also includes popping emitted code portions from the auxiliary physical call stack in response to corresponding inter-thread communication indicative of leaving a defined state in the source input data. Managing the auxiliary thread also includes distinguishing between helper function code and emitted code portions within the auxiliary physical call stack. Distinguishing between helper function code and emitted code portions permit the auxiliary thread to provide the debugger with the emitted code portions such that the debugger can step through the emitted code portions to simulate stepping through the source input data.

In other embodiments, a debugger steps through a source input data. An interpreter interprets a portion of the source input file to cause a state transition between defined states within the source input dat. A primary thread sends inter-thread communication to a helper function. The inter-thread communication is indicative of the state transition within the source input data.

The helper function alters the configuration of an auxiliary physical call stack in response to the indicated state transition. Altering the configuration of the auxiliary call stack includes altering the configuration of emitted code portions stored in the auxiliary physical call stack. Each emitted code portion corresponds to a defined state of the input source file. A debugger utilizes the auxiliary physical call stack to step through the emitted code portions so as to simulate stepping through the input source file as it is interpreted.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
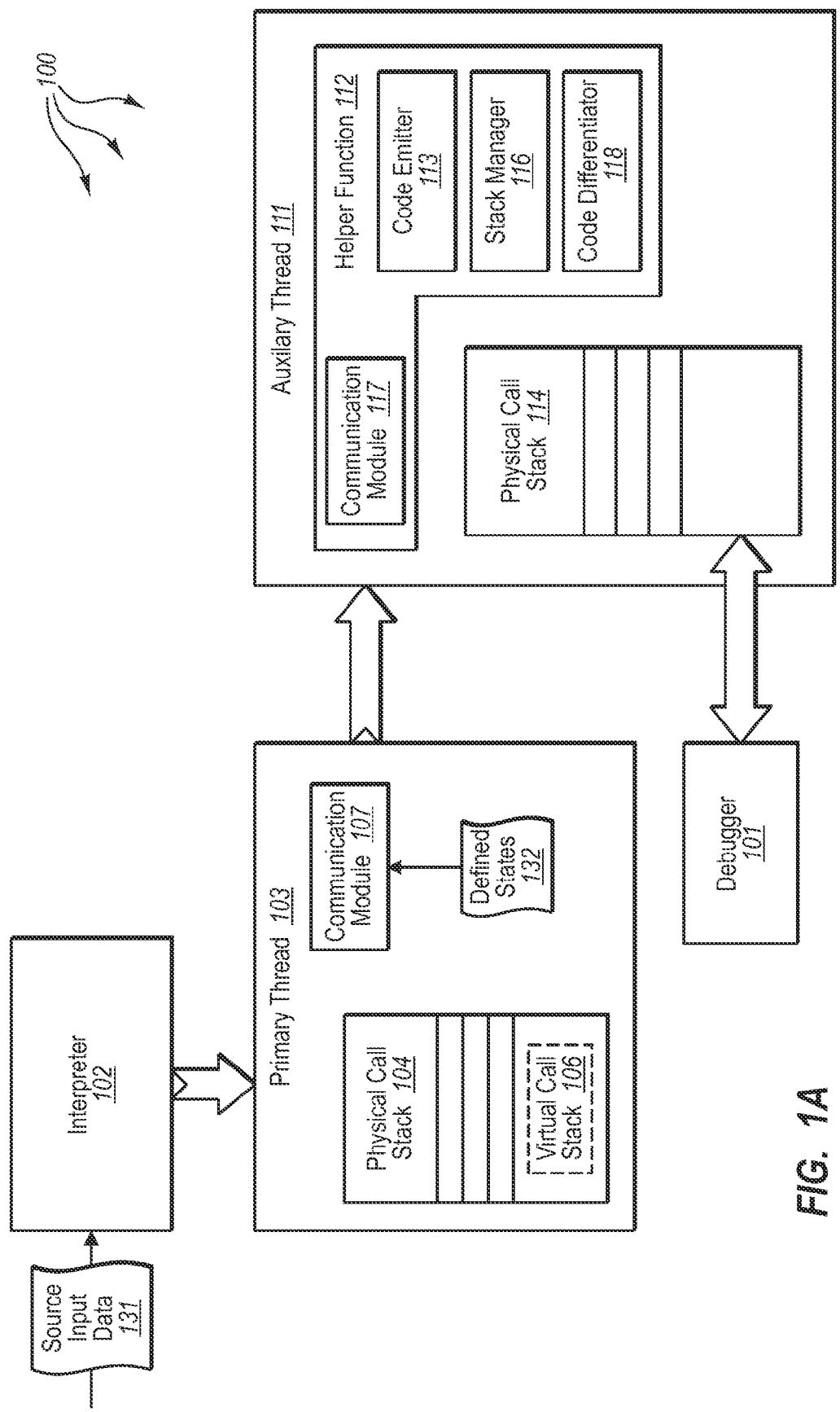
FIG. 1A illustrates an example computer architecture that facilitates adapting interpreted code into a format that is compatible with a stepping operation of a debugger.

The present invention extends to methods, systems, and computer program products for simulating stepping through interpreted code. In some embodiments, a computer system is configured to adapt interpreted code into a format that is compatible with a stepping operation of a debugger. An interpreter receives an indication that it is to interpret source input data. The interpreter initiates a primary thread to interpret the source input data. The primary thread includes a primary physical call stack for the interpreter. A "virtual call stack" for the source input data is stored as data within the primary physical call stack. The virtual call stack changes as the interpreter executes.

The primary thread defines states in the source input data. The primary threads initializing an auxiliary thread. The auxiliary thread includes an auxiliary physical call stack and a helper function. The helper function is configured to emit code portions corresponding to each defined state. The code portions are in a format that is compatible with the stepping operation of the debugger. The helper function is configured to receive inter-thread communication from the primary thread indicative of entering and leaving defined states within the source input data during interpreting.

The helper function is configured to manage the auxiliary physical call stack to represent the virtual call stack for the source input data to the debugger. Managing the auxiliary thread includes pushing emitted code portions onto the auxiliary physical call stack in response to corresponding inter-thread communication indicative of entering a defined state in the source input data. Managing the auxiliary thread also includes popping emitted code portions from the auxiliary physical call stack in response to corresponding inter-thread communication indicative of leaving a defined state in the source input data. Managing the auxiliary thread also includes distinguishing between helper function code and emitted code portions within the auxiliary physical call stack. Distinguishing between helper function code and emitted code portions permit the auxiliary thread to provide the debugger with the emitted code portions such that the debugger can step through the emitted code portions to simulate stepping through the source input data.

In other embodiments, a debugger steps through a source input data. An interpreter interprets a portion of the source input file to cause a state transition between defined states within the source input dat. A primary thread sends inter-thread communication to a helper function. The inter-thread communication is indicative of the state transition within the source input data.

The helper function alters the configuration of an auxiliary physical call stack in response to the indicated state transition. Altering the configuration of the auxiliary call stack includes altering the configuration of emitted code portions stored in the auxiliary physical call stack. Each emitted code portion corresponds to a defined state of the input source file. A debugger utilizes the auxiliary physical call stack to step through the emitted code portions so as to simulate stepping through the input source file as it is interpreted.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates to adapt interpreted code into a format that is compatible with a stepping operation of a debugger. Referring to FIG. 1A, computer architecture 100 includes debugger 101 and interpreter 102. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer architecture 100 includes interpreter 102 and debugger 101. Generally, interpreter 101 is configured to run other non-executable programs (e.g., programming language source code, project files, etc.) directly, without a compiler. Debugger 101 is configured to test and debug other programs. Debugger 101 can include functionality to perform one or more of: setting breakpoints within the code of other programs, stepping (e.g., single stepping) through the code of other programs, inspecting values within the code of other programs, inspecting callstacks within the code of other programs, and inspecting expressions within the code of other programs.

Figure 2:
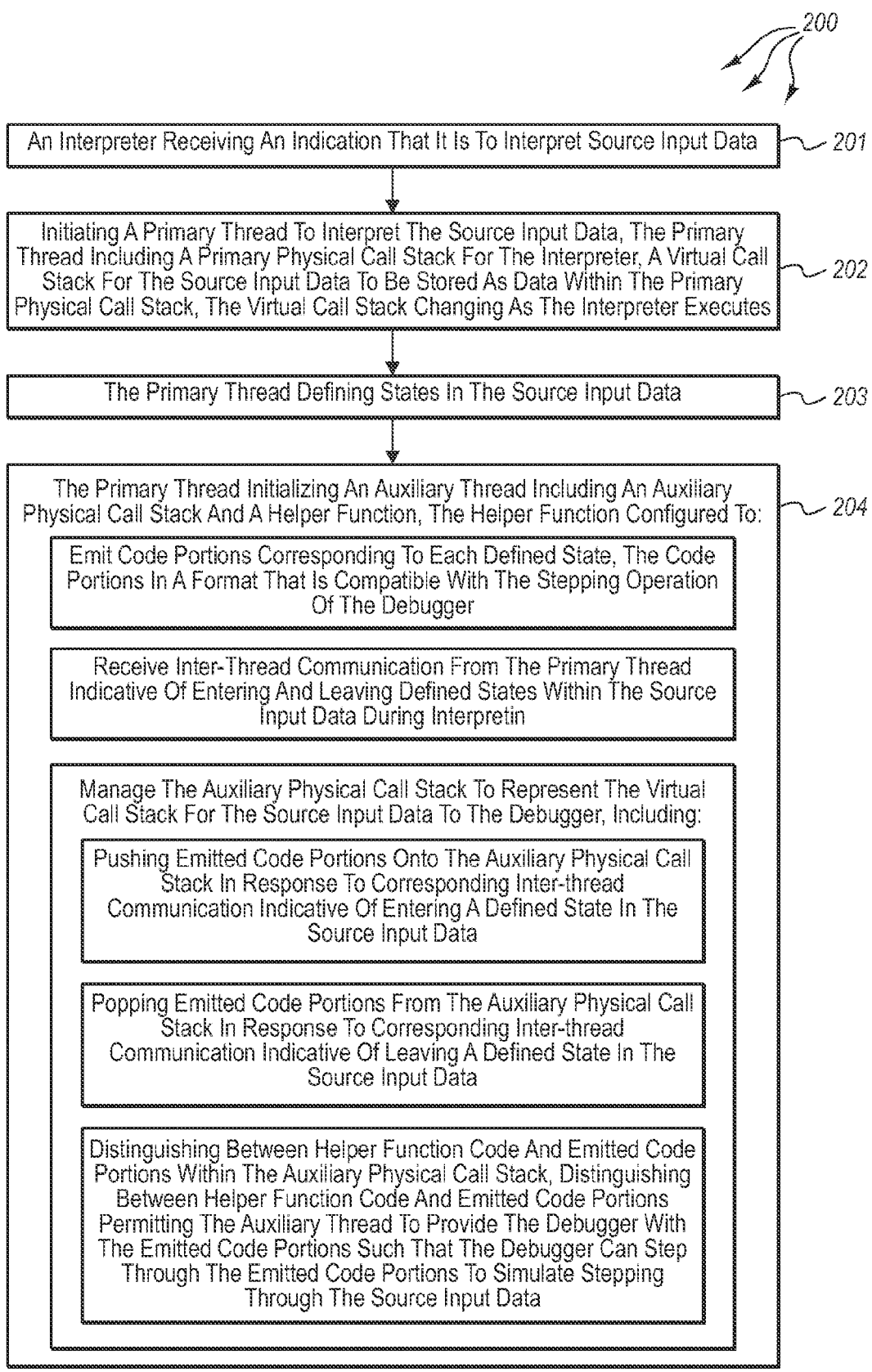
FIG. 2 illustrates a flow chart of an example method for adapting interpreted code into a format that is compatible with a stepping operation of a debugger.

FIG. 2 illustrates a flow chart of an example method for adapting interpreted code into a format that is compatible with a stepping operation of a debugger. The method 200 will be described with respect to the components and data in computer architecture 100.

Method 200 includes an act of an interpreter receiving an indication that it is to interpret source input data (act 201). For example, interpreter 102 can receive source input data 131 (e.g., programming language source code, a project file, etc.). Method 200 includes an act initiating a primary thread to interpret the source input data, the primary thread including a primary physical call stack for the interpreter, a virtual call stack for the source input data to be stored as data within the primary physical call stack, the virtual call stack changing as the interpreter executes (act 202). For example, interpreted 102 can initiate primary thread 103 to interpret source input data 131. Primary thread 103 includes physical call stack 104 for interpreter 102. Virtual call stack 106 is store as data (e.g., embedded within) physical call stack 104. Virtual call stack 106 changes as interpreter 102 executed source input data 131.

Method 200 includes an act of the primary thread defining states in the source input data (act 203). For example, primary thread 132 can define defined states 132 for source input data 131. Defined states 132 can represent some unit of functionality within source input data (e.g., each line of code, entering/leaving functions, etc.). Primary thread 132 can call out to an external helper library (e.g., a DLL) that parses source input data 131 based on state transition criteria to assist in defining the states within source input data 132. For example, within a C# program the ";" character can be identified as a transition between lines of code (i.e., states).

Method 200 includes an act of the primary thread initializing an auxiliary thread including an auxiliary physical call stack and a helper function (act 304). For example, primary thread 103 can initialize auxiliary thread 11 1 (having physical call stack 114) and helper function 112. Primary thread 103 and/or auxiliary thread 111 can call out to an external helper library to initiate helpful function 112. As depicted, helper function 112 includes code emitter 113, stack manager 116, communication module 117, and code differentiator 118.

A helper function can be configured to emit code portions corresponding to each defined state. The code portions can be in format that is compatible with the stepping operation of the debugger. The helper function can also match define state transitions in source input data to code portions representative of defined states within the input source data. For example, code emitter 113 is configured to match state transitions in source input data 131 to code portions representative of defined states 132. Code emitter 113 is also configured to emit code portions corresponding to defined states 132. The emitted code portions can be in a format compatible with a stepping operation of debugger 101.

A helper function can also be configured to receive inter-thread communication from the primary thread indicative of entering and leaving defined states within the source input data during interpreting. For example, communication module 117 can be configured to receive inter-thread communication from communication module 107. Inter-thread communication from communication module 107 can indicate entering and leaving defined states (as defined in defined states 132) within source input data 131.

A helper function can also be configured to manage the auxiliary physical call stack to represent the virtual call stack for the source input data to the debugger. For example, stack manager 116 and code differentiator 118 can be configured to interoperate to manage physical call stack 114 to represent virtual call stack 106 (in a compatible format) to debugger 101.

Management of an auxiliary call stack can include pushing emitted code portions onto the auxiliary physical call stack in response to corresponding inter-thread communication indicative of entering a defined state in the source input data. For example, stack manager 166 can be configured to push emitted code portions from code emitter 113 onto physical call stack 114. Emitted code portions can be pushed onto physical call stack 114 in response to inter-thread communication from primary thread 103 indicating that source input data 131 has entered a corresponding defined state.

Management of an auxiliary call stack can include popping emitted code portions from the auxiliary physical call stack in response to corresponding inter-thread communication indicative of leaving a defined state in the source input data. For example, stack manager 166 can be configured to pop emitted code portions off of physical call stack 114. Emitted code portions can be popped off of physical call stack 114 in response to inter-thread communication from primary thread 103 indicating that source input data 131 has left a corresponding defined state.

Management of an auxiliary call stack can include distinguishing between helper function code and emitted code portions within the auxiliary physical call stack. Distinguishing between helper function code and emitted code portions permits the auxiliary thread to provide the debugger with the emitted code portions such that the debugger can step through the emitted code portions to simulate stepping through the source input data. As helper function 112 and its corresponding modules perform computing operations, these computing operations can also cause code to be pushed into and popped off of physical call stack 114. Code differentiator 118 can be configured to mark code in physical call stack 114 as either emitted code (thus corresponding to source input data 131) or code that is part of helper function 112. Helpful function 112 can control physical call stack 114 such that emitted code interacts with debugger 101, while other code is ignored by debugger 101.

Figure 1B:
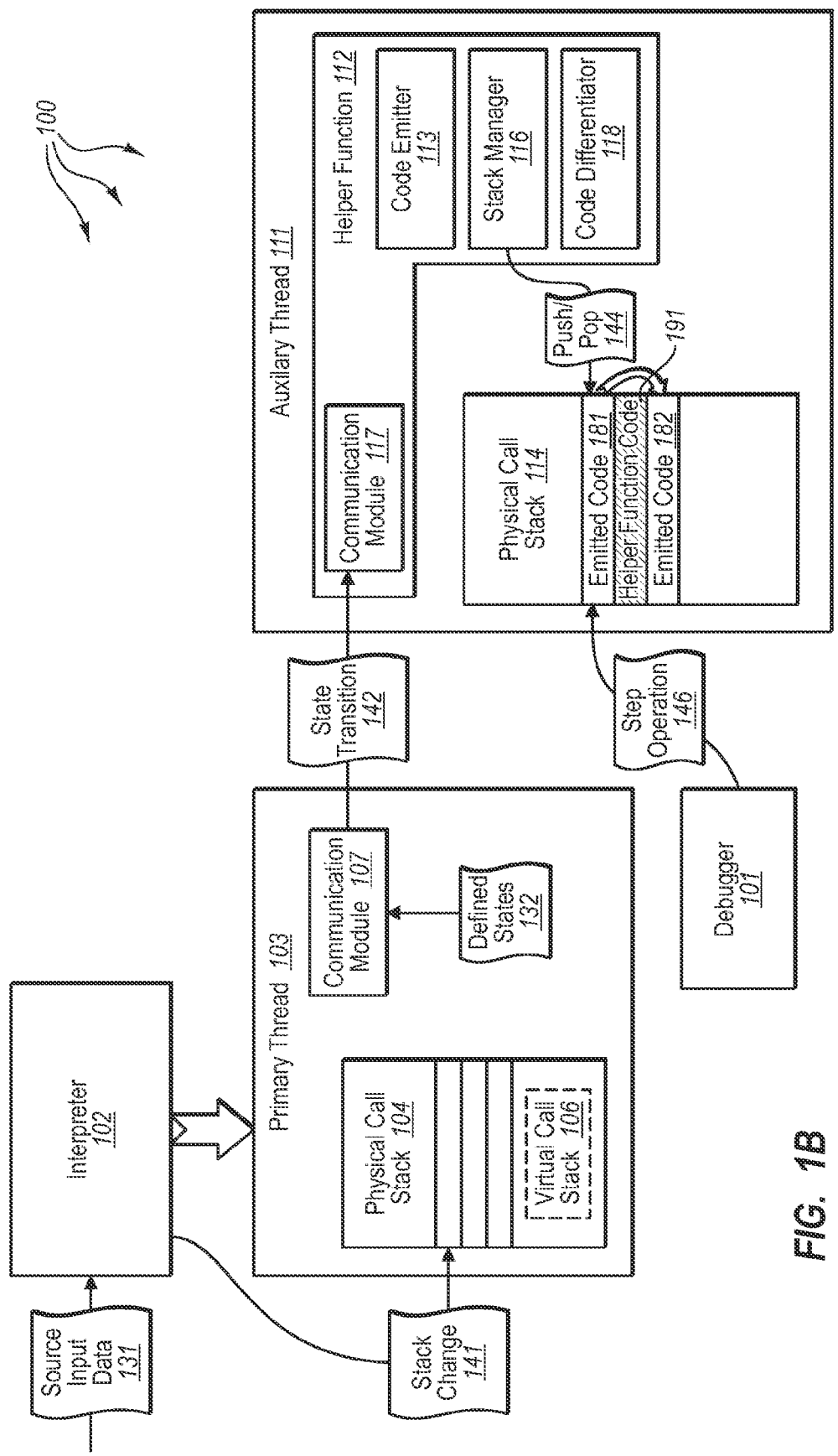
FIG. 1B illustrates an example computer architecture that facilitates a debugger stepping through source input data.
Figure 3:
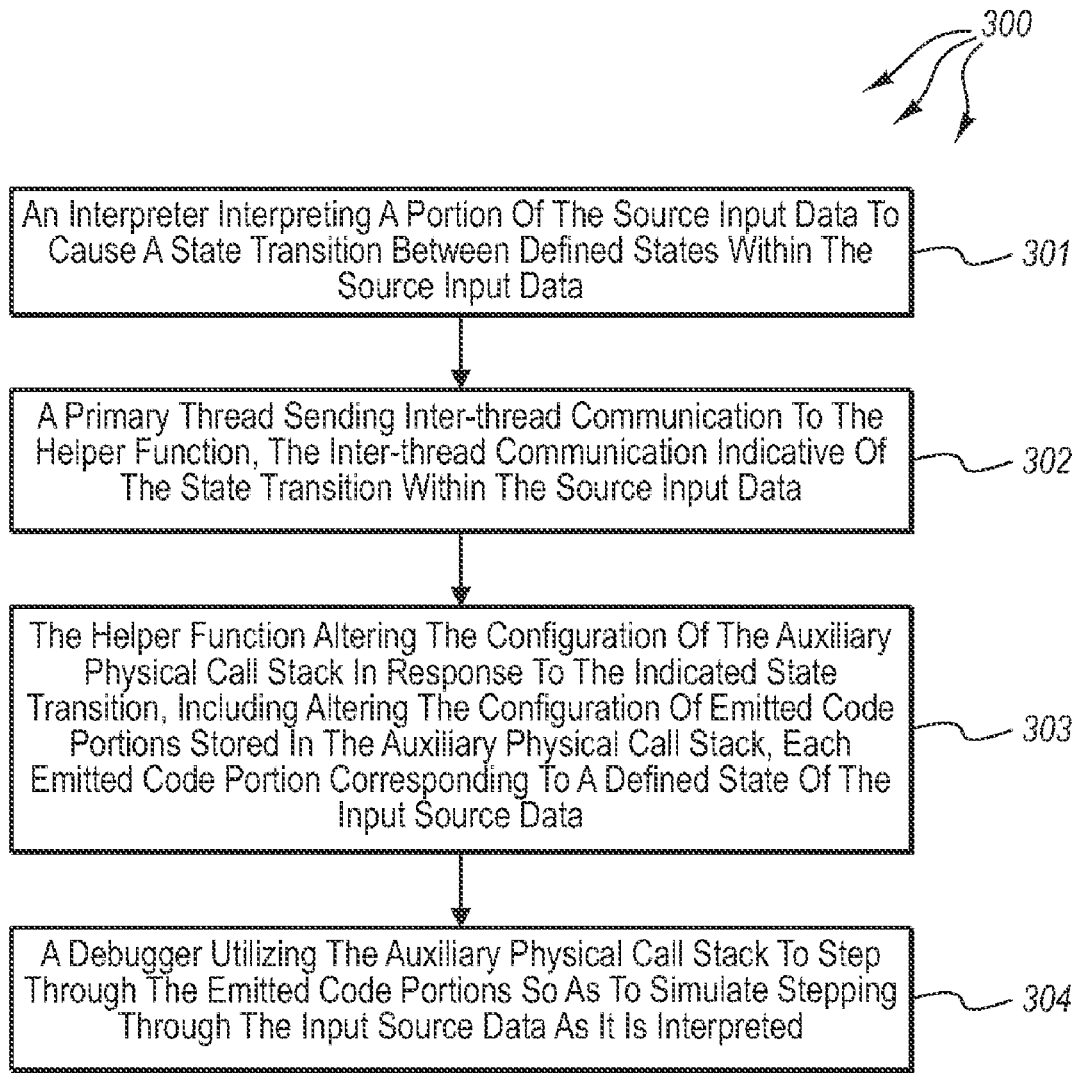
FIG. 3 illustrates a flow chart of an example method for stepping through a source input file.

Subsequent to configuration, embodiments of the invention can debug interpreted code. FIG. 1B depicts components of architecture 100 debugging source input data 131. FIG. 3 illustrates a flow chart of an example method 300 for stepping through a source input file. Method 300 will be described with respect to the components and data in computer architecture 100.

Method 300 includes an act of an interpreter interpreting a portion of the source input data to cause a state transition between defined states within the source input data (act 301). For example, interpreter 102 can interpret a portion of source input data 131 to cause a transition between defined states (as defined in defined states 132) within source input data 131. Interpreter 102 can issue stack change 141 to change the configuration of physical call stack 104 (e.g., pushing or popping entries). Changes to physical call stack 104 can correspondingly change virtual call stack 106.

Method 300 includes an act of the primary physical thread sending inter-thread communication to the helper function, the inter-thread communication indicative of the state transition within the source input data (act 302). For example, primary thread 103 (through communication module 107) can send state transition 142 to helper function 112. Helper function 112 (through communication module 117) can receive the state transition 142 from primary thread 103. State transition 142 indicates the state transition caused by stack change 141 to helper function 112.

Method 300 includes an act of the helper function altering the configuration of the auxiliary physical call stack in response to the indicated state transition, including altering the configuration of emitted code portions stored in the auxiliary physical call stack, each emitted code portion corresponding to a defined state of the input source data (act 303). For example, helper function 112 can alter physical call stack 114 in response to the state transition. Stack manager 116 can alter emitted code portions, corresponding to defined states of source input data 131, from physical call stack 114 in response to the state transition. For example, stack manager 116 can issue push/pop 144 to physical call stack 114. Push/pop 144 can cause an emitted code portion corresponding to a state to be pushed onto physical call stack 114 when the state is entered. Push/pop 144 can cause an emitted code portion corresponding to a state to be popped from physical call stack 114 when the state is exited.

Method 300 includes an act of a debugger utilizing the auxiliary physical call stack to step through the emitted code portions so as to simulate stepping through the input source data as it is interpreted (act 304). For example, debugger 101 can utilize physical call stack 114 to step through emitted code portions to simulate stepping through source input data 131. Thus, debugger 101 can step from (emitted code representing) one portion of source input data 131 to (emitted code representing) another portion source input data 131.

For example, debugger 101 can be viewing emitted code 181 corresponding to a line of code in source input data 131. Debugger 101 can then issue step operation 146, for example, to step to emitted code representing the next line in source input data 131. Helper function 112 can push frames onto or pop frames off of physical call stack 114 to point to emitted code 182 (moving past helper function code 191). If a debugger 101 has issued a step operation 146, it will trap the transition in emitted code states from 181 to 182. Components in the interpreter need not even be aware that the debugger is doing a step operation.

Embodiments of the present invention facilitate debugging interpreted code. Thus, existing debugger technologies (e.g., those configured for use with compiled code) can be utilized to debug interpreted code. More specifically, existing debugger technologies can be used to step through interpreted code, without stepping into the code of interpreter itself Accordingly, users developing interpreted code can be provided a stepping experience of relatively the same quality as provided to developers developing compiled code, without having to reengineer debuggers to compensate for interpreted code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a debugger, the debugger configured to perform one or more debugging operations, including a stepping operation for stepping through compiled code, a method for configuring the computer system to adapt interpreted code into a format that is compatible with the stepping operation such that the debugger can step through the interpreted code, the method comprising:
  an act of an interpreter receiving an indication that it is to interpret source input data;
  an act of initiating a primary thread to interpret the source input data, the primary thread including a primary physical call stack for the interpreter, a virtual call stack for the source input data to be stored as data within the primary physical call stack, the virtual call stack changing as the interpreter executes;
  an act of the primary thread defining states in the source input data;
  an act of the primary thread initializing an auxiliary thread including an auxiliary physical call stack and a helper function, the helper function configured to:
    emit code portions corresponding to each defined state, the code portions in a format that is compatible with the stepping operation of the debugger;
    receive inter-thread communication from the primary thread indicative of entering and leaving defined states within the source input data during interpreting;
    manage the auxiliary physical call stack to represent the virtual call stack for the source input data to the debugger, including:
      pushing emitted code portions onto the auxiliary physical call stack in response to corresponding inter-thread communication indicative of entering a defined state in the source input data;
      popping emitted code portions from the auxiliary physical call stack in response to corresponding inter-thread communication indicative of leaving a defined state in the source input data; and
      distinguishing between helper function code and emitted code portions within the auxiliary physical call stack, thus permitting the auxiliary thread to provide the debugger with the emitted code portions such that the debugger can step through the emitted code portions to simulate stepping through the source input data.

2. The method as recited in claim 1, wherein the act of an interpreter receiving an indication that it is to interpret source input data comprises an act of an interpreter receiving an indication that it is to interpret programming language source code.

3. The method as recited in claim 1, wherein the act of initiating a primary thread to interpret the source input data comprises an act of initiating a primary thread to interpret programming language source code.

4. The method as recited in claim 1, wherein the act of initiating a primary thread to interpret the source input data comprises an act of initiating a primary thread including a primary physical call stack having a virtual call stack for the source input data embedded within primary physical call stack.

5. The method of claim 1, wherein the act of the primary thread defining states in the source input data comprises an act of the primary thread defining each line in the source input data as a different state.

6. The method as recited in claim 1, wherein the act of distinguishing between helper function code and emitted code portions within the auxiliary physical call stack comprises an act of marking emitted code portions as corresponding to the source input data.

7. At a computer system, the computer system including a debugger, a, primary thread, and an auxiliary thread, the debugger configured to perform one or more debugging operations, including a stepping operation for stepping through compiled code, the primary thread including a primary physical call stack for an interpreter that is interpreting a source input data, the primary physical call stack containing data representing a virtual call stack for the source input data, the auxiliary thread including a helper function and an auxiliary physical call stack, the helper function for matching defined state transitions in the source input data to emitted code portions representative of defined states within the input source data and managing emitted code portions within the auxiliary physical call stack, a method for stepping through the source input data, the method comprising:
  an act of the interpreter interpreting a portion of the source input data to cause a state transition between defined states within the source input data;
  an act of the primary thread sending inter-thread communication to the helper function, the inter-thread communication indicative of the state transition within the source input data;
  an act of the helper function altering the auxiliary physical call stack in response to the indicated state transition, including altering the emitted code portions stored in the auxiliary physical call stack, each emitted code portion corresponding to a defined state of the input source data; and
  an act of the debugger utilizing the auxiliary physical call stack to step through the emitted code portions so as to simulate stepping through the input source data as it is interpreted.

8. The method as recited in claim 7, wherein the act of the interpreter interpreting a portion of the source input data to cause a state transition between defined states within the source input data comprises an act of the interpreter interpreting a line of programming language source code.

9. The method as recited in claim 7, wherein the act of the interpreter interpreting a portion of the source input data to cause a state transition between defined states within the source input data comprises an act of the interpreter altering a call stack in the primary thread.

10. The method as recited in claim 7, wherein the act of the primary thread sending inter-thread communication to the helper function comprises an act of the primary thread sending a state transition message to the helper function.

11. The method as recited in claim 7, wherein the act of the helper function altering the configuration of the auxiliary physical call stack in response to the indicated state transition comprises an act of pushing an emitted code portion onto the auxiliary physical call stack.

12. The method as recited in claim 7, wherein the act of the helper function altering the configuration of the auxiliary physical call stack in response to the indicated state transition comprises an act of popping an emitted code portion from the auxiliary physical call stack.

13. The method as recited in claim 7, wherein the act of the helper function altering the configuration of the auxiliary physical call stack in response to the indicated state transition comprises an act altering the auxiliary physical call stack to simulate the virtual call stack.

14. The method as recited in claim 7, further comprising:
  an act of marking emitted code portions in the auxiliary physical call stack as corresponding to the source input data to distinguish the emitted code portions from the code of the helpful function.

15. The method as recited in claim 14, wherein the act of the debugger utilizing the auxiliary physical call stack to step through the emitted code portions comprises moving a pointer from a first stack location containing an emitted code portion, past one or more other stack locations containing helper function code, to a second stack location containing an emitted code portion.

16. The method as recited in claim 14, wherein computer-executable instructions that, when executed, cause the computer system to utilize the auxiliary physical call stack to step through the emitted code portions comprise computer-executable instructions that, when executed, cause the computer system to move a pointer from a first stack location in the auxiliary physical call stack containing an emitted code portion, past one or more other stack locations containing helper function code, to a second stack location in the auxiliary physical call containing an emitted code portion.

17. A computer system, the computer system comprising:
  system memory;
  one or more processors;
  one or more physical storage media having stored thereon computer-executable instructions that, when executed at one of the one or more processors, cause the computer system to configure the computer system to adapt interpreted code into a format that is compatible with a stepping operation of a debugger such that the debugger can step through the interpreted code, including performing the following:
    receiving an indication that an interpreter is to interpret source input data;
    initiate a primary thread to interpret the source input data, the primary thread including a primary physical call stack for the interpreter, a virtual call stack for the source input data to be stored as data within the primary physical call stack, the virtual call stack changing as the interpreter executes;
    define states in the source input data;
    initializing an auxiliary thread including an auxiliary physical call stack and a helper function, the helper function configured to:
      emit code portions corresponding to each defined state, the code portions in a format that is compatible with the stepping operation of the debugger;
      receive inter-thread communication from the primary thread indicative of entering and leaving defined states within the source input data during interpreting;
      manage the auxiliary physical call stack to represent the virtual call stack for the source input data to the debugger, including:
        pushing emitted code portions onto the auxiliary physical call stack in response to corresponding inter-thread communication indicative of entering a defined state in the source input data;
        popping emitted code portions from the auxiliary physical call stack in response to corresponding inter-thread communication indicative of leaving a defined state in the source input data; and
        distinguishing between helper function code and emitted code portions within the auxiliary physical call stack, distinguishing between helper function code and emitted code portions permitting the auxiliary thread to provide the debugger with the emitted code portions such that the debugger can step through the emitted code portions to simulate stepping through the source input data; and
  wherein the one or more physical storage media also having stored thereon computer-executable instructions that, when executed at one of the one or more processors subsequent to appropriate configuration, cause the computer system to step through the source input data, including performing the following:
    interpret a portion of the source input data to cause a state transition between defined states within the source input data;
    send inter-thread communication to the helper function, the inter-thread communication indicative of the state transition within the source input data;
    alter the auxiliary physical call stack in response to the indicated state transition, including altering the emitted code portions stored in the auxiliary physical call stack, each emitted code portion corresponding to a defined state of the input source data; and
    the debugger utilizing the auxiliary physical call stack to step through the emitted code portions so as to simulate stepping through the input source data as it is interpreted.

18. The computer system as recited in claim 17, wherein the source input data is programming language source code.

19. The computer system as recited in claim 17, wherein computer-executable instructions that, when executed, cause the computer system to alter the configuration of the auxiliary physical call stack in response to the indicated state transition comprise computer-executable instructions that, when executed, cause the computer system to perform one of: popping an emitted code portion from the auxiliary physical call stack and pushing an emitted code portion onto the auxiliary physical call stack.

20. The computer system as recited in claim 17, further comprising:
  computer-executable instructions that, when executed, cause the computer system to mark emitted code portions in the auxiliary physical call stack as corresponding to the source input data to distinguish the emitted code portions from the code of the helpful function.

* * * * *